US011824765B2

(12) United States Patent
Heron et al.

(10) Patent No.: US 11,824,765 B2
(45) Date of Patent: Nov. 21, 2023

(54) FAST REDIRECT OF TRAFFIC WHEN PODS FAIL

(71) Applicant: Cisco Technology, Inc., San Jose, CA (US)

(72) Inventors: Giles Douglas Yorke Heron, London (GB); Edward A. Warnicke, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 1096 days.

(21) Appl. No.: 16/226,163

(22) Filed: Dec. 19, 2018

(65) Prior Publication Data

US 2020/0204481 A1 Jun. 25, 2020

(51) Int. Cl.
*H04L 45/28* (2022.01)
*H04L 45/745* (2022.01)
*H04L 41/0668* (2022.01)
*G06F 9/48* (2006.01)
*H04L 45/00* (2022.01)
*H04L 45/02* (2022.01)
*H04L 49/00* (2022.01)
*H04L 41/0663* (2022.01)

(52) U.S. Cl.
CPC ............ *H04L 45/28* (2013.01); *G06F 9/4856* (2013.01); *H04L 41/0663* (2013.01); *H04L 41/0668* (2013.01); *H04L 45/02* (2013.01); *H04L 45/22* (2013.01); *H04L 45/745* (2013.01); *H04L 49/70* (2013.01)

(58) Field of Classification Search
USPC .......................................................... 370/216
See application file for complete search history.

(56) References Cited

U.S. PATENT DOCUMENTS

| | | | | |
|---|---|---|---|---|
| 8,639,793 B2 * | 1/2014 | Kapur | ................... | G06F 11/203 |
| | | | | 709/223 |
| 9,049,115 B2 * | 6/2015 | Rajendran | ............... | H04L 12/28 |
| 9,565,105 B2 * | 2/2017 | Kapadia | ................ | H04L 45/745 |
| 9,967,231 B2 * | 5/2018 | Shetty | ................. | H04L 12/4633 |
| 10,812,366 B1 * | 10/2020 | Berenberg | .......... | H04L 41/0806 |
| 2010/0020806 A1 * | 1/2010 | Vahdat | ................ | H04L 45/7453 |
| | | | | 370/395.31 |
| 2012/0110186 A1 * | 5/2012 | Kapur | ................... | G06F 9/5072 |
| | | | | 709/226 |
| 2014/0075445 A1 * | 3/2014 | Wang | ........................ | G06F 9/50 |
| | | | | 718/104 |

(Continued)

*Primary Examiner* — Alpus Hsu
*Assistant Examiner* — Hooman Houshmand
(74) *Attorney, Agent, or Firm* — Polsinelli

(57) ABSTRACT

Systems, methods, and devices are disclosed for re-routing network traffic directed to a pod device. Traffic is routed from an ingress device towards a first node in communication with multiple pods. In response to the detection of a failure event associated with the first pod, a network device address of the first pod is removed from a routing table. If a packet is received from the ingress device that is destined for a service, the routing table is used to look up a pod for handling a service request associated with the service. A network device address of a second pod is determined based on not finding the network device address of the first pod in the routing table. The packet is then forwarded to the second pod using the second device address before the ingress device knows that the first pod has failed.

20 Claims, 6 Drawing Sheets

(56) References Cited

U.S. PATENT DOCUMENTS

| | | | |
|---|---|---|---|
| 2014/0372582 A1* | 12/2014 | Ghanwani | H04L 45/745 709/223 |
| 2016/0277355 A1* | 9/2016 | Shetty | H04L 49/3009 |
| 2019/0306231 A1* | 10/2019 | Shimoga Manjunatha | H04L 63/0263 |
| 2020/0019471 A1* | 1/2020 | Natanzon | G06F 11/302 |
| 2020/0389404 A1* | 12/2020 | Wu | H04L 47/125 |

* cited by examiner

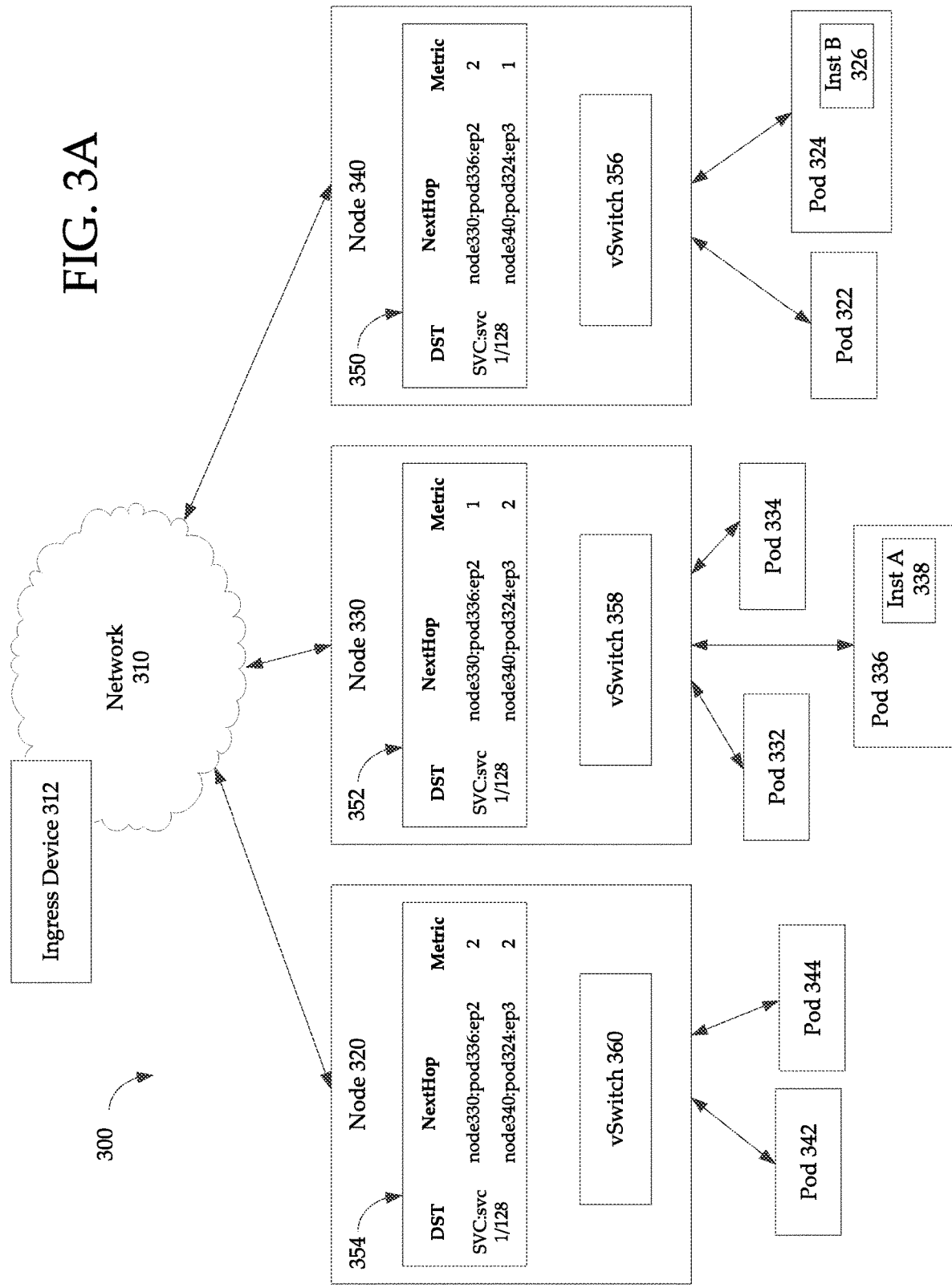

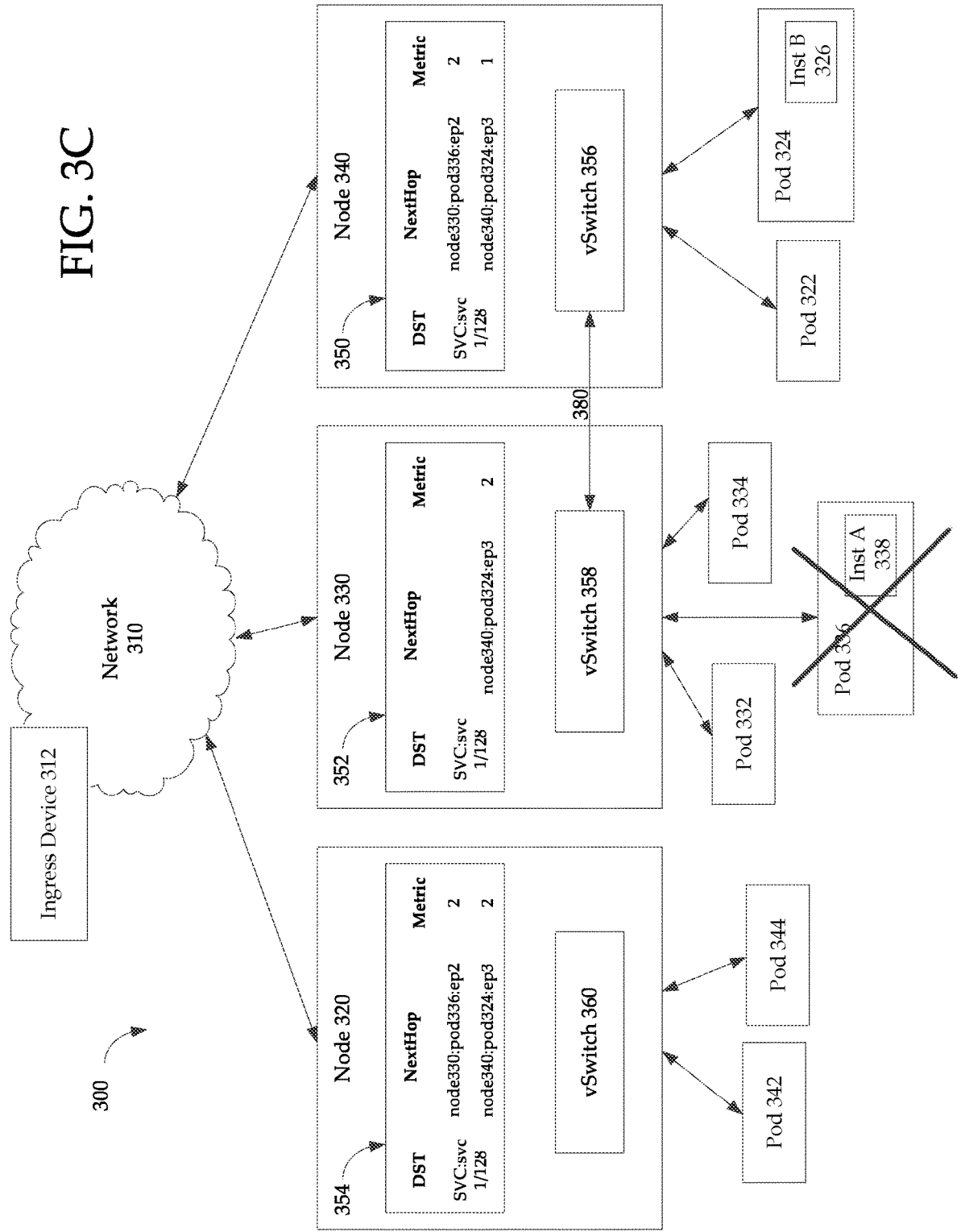

FAST REDIRECT OF TRAFFIC WHEN PODS FAIL

TECHNICAL FIELD

The present disclosure relates generally to the redirection of network traffic and more specifically, to the redirection of traffic in response to the detected failure of a network pod.

BACKGROUND

Services can be represented by cluster Internet Protocol addresses (IPs). Traffic for a service towards a cluster IP can be load balanced across a set of pods implementing that service using Network Address Translation (NAT) rules at an ingress server of a network. When a destination pod fails, the server hosting it notifies the control plane of the network, which then updates the NAT rules on the other servers in the cluster. This, however, takes more time than is desired. It would be better if traffic could be re-routed the instant the destination server detects the failure.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which:

FIG. 3A shows an example schematic diagram of network traffic in accordance with some embodiments;

FIG. 3C shows an example schematic diagram of re-routing network traffic in accordance with some embodiments;

DESCRIPTION OF EXAMPLE EMBODIMENTS

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

Overview

Systems, methods, computer-readable media, and devices are disclosed for re-routing network traffic directed to one or more pod devices. Traffic is directed from an ingress device towards a node in communication with multiple pods, such that a first pod is configured to receive traffic from the ingress device. In response to the detection of a failure event associated with the first pod, a network device address of the first pod is removed from a routing table. If a packet is received from the ingress device that is destined for a service, the routing table is used to look up a pod for handling a service request associated with the service. A network device address of a second pod is determined based on not finding the network device address of the first pod in the routing table. The packet is then forwarded to the second pod using the second device address before the ingress device knows that the first pod has failed.

Example Embodiments

The disclosed technology addresses the need in the art for re-routing network traffic directed to one or more pods. Pods can be devices, both physical and virtual, that can execute instances of an application or service. For example, pods can be containers that run real applications that conserve virtual IP addresses (e.g., the cluster IP). The cluster IP can refer to a cluster including a set of servers, called nodes. Each node can have a number of pods, and each node can have a block of address space for its pod IPs. This is done so that an application or service can run on many different servers (nodes) at the same time, but without the ingress device being aware of that. Accordingly, traffic can be directed from an ingress device to multiple nodes in communication with multiple pods, such that any pod within the cluster of nodes can receive traffic from the ingress device.

In response to the detection of a failure event associated with the first pod, a network device address of the first pod is removed from a routing table on the node. If the node subsequently receives a packet from the ingress device, a network device address of a second pod is determined based on not finding the network device address of the first pod in the routing table. The packet is then forwarded to the second pod using the second device address before the ingress device knows that the first pod has failed.

Figure 1:
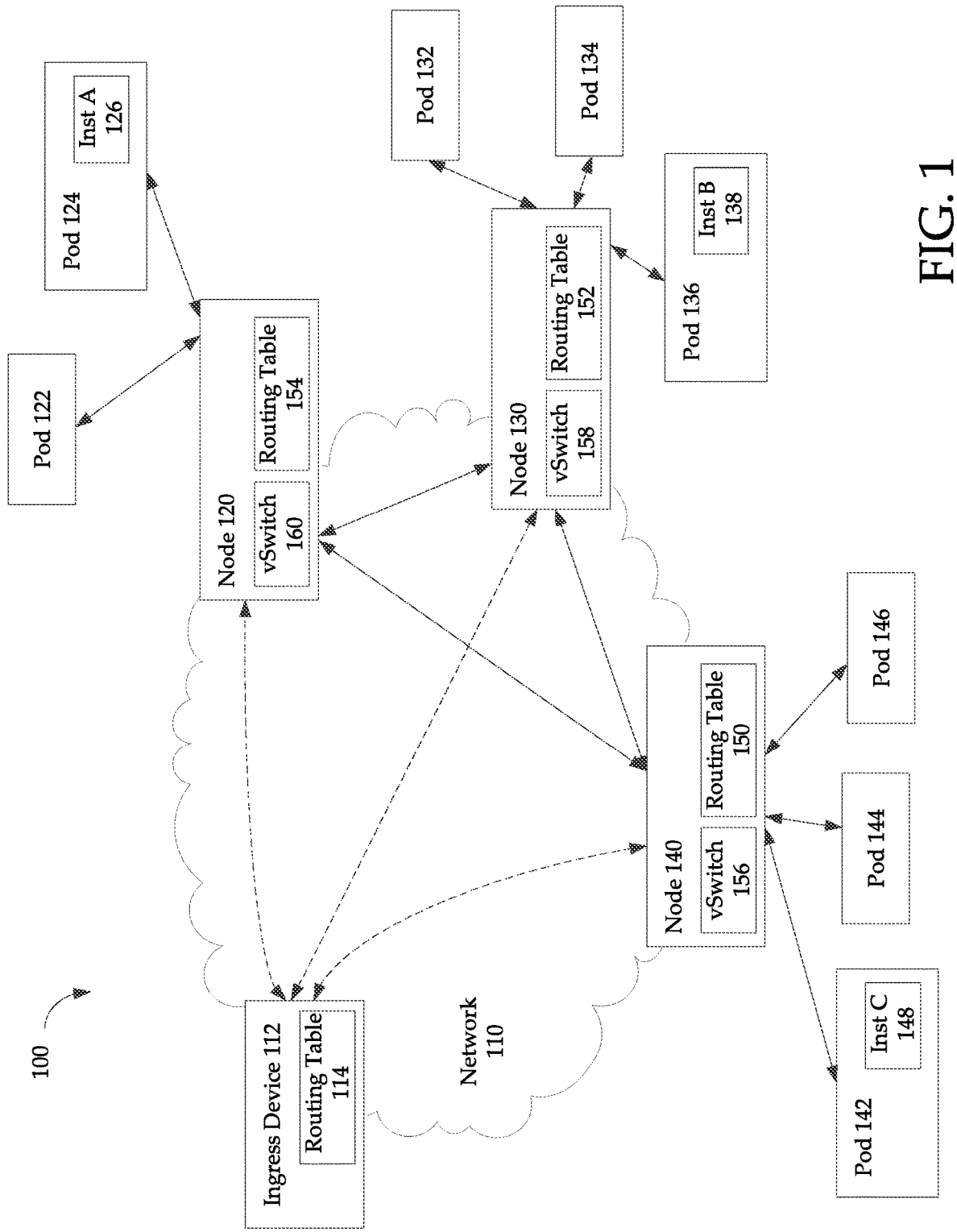
FIG. 1 shows an example schematic diagram of a framework for re-routing network traffic directed to one or more pod devices in accordance with some embodiments.

FIG. 1 shows an example schematic diagram of a framework for re-routing network traffic directed to one or more pod devices in accordance with some embodiments. System 100 comprises network 110 including ingress device 112 and multiple nodes. In the example embodiment, for example, network 110 includes ingress device 112 and nodes 120, 130, and 140. The ingress device 112 can also be a node within system 100 and load balances requests for applications across the nodes of network 110.

Each node can be a server or other similar device that is in communication with and/or managing any number of pods, which can be physical or virtual devices. For example, in the shown embodiment, node 120 is in communication with pod 122 and pod 124; node 130 is in communication with pod 132, pod 134, and pod 136; and node 140 is in communication with pod 142, pod 144, and pod 146.

At ingress device 112, system 100 will choose which one of potentially many instances of an application or service to direct packets toward. The selection of particular nodes by ingress device 112 may be done on a round robin, load balancing basis. For example, for a certain request for an application, ingress device 112 can send traffic to node 140, which can then route traffic towards an executing instance on one of its pods. For another request for the same application, ingress device can send traffic for the next request to node 130, which may route traffic towards an executing instance on another pod.

In some embodiments ingress device 112 may have a routing table that directs traffic towards one or more of ingress device's 112 selected nodes, such as node 120, node 130, and/or node 140. Each node can also have its own routing table listing the pods that are local to it and/or the other nodes in system 100. For example, routing table 150 on node 140 may have a listing of pods 142, 144, and 146; routing table 152 on node 130 may have a listing of pods 132, 134, and 136; and routing table 154 may have a listing of pods 122 and 124. Routing table 150, 152, and 154 may also include a listing of all the nodes (and each node's associated pods) on system 100, including each other. vSwitch 156, 158, and 160 on nodes 140, 130, and 120, respectively, can include functionality to direct or re-direct traffic between the nodes on system 100. For example, vSwitch 156 on node 140 can route or re-route traffic from node 140 to node 130 and/or node 120.

Ingress device 112 can include an interface that takes in a request for an application or service. The application or service can be associated with multiple instances already executing on the pods that are in communication with system 100's nodes, such as pods that are in communication with nodes 120, 130, and/or 140. Thus, in some embodiments the application or service can be associated with multiple instances executing on any number of pods at a time.

For example, ingress device 112 may receive a request for an application with instances executing across at least one pod device for node 120, node 130, and node 140. For instance, the application may have instance A 126 executing on pod 124 in communication with node 120, instance B 138 executing on pod 136 in communication with node 130, and instance C 148 executing on pod 142 in communication with node 140. In some embodiments, each instance executing on the pods are configured to execute similar executing instances of the application. For example, instance A 126, instance B 138, and instance C 148 may be executing the same or similar instances of the application received from ingress device 112. Pods 122, 132, 134, 144, and 146, while connected to their respective nodes, do not have an instance of the application currently executing on them, although embodiments do not restrict instances from executing on them at a later time or for a different application.

The routing tables across all devices on network 110 can be updated periodically. Each update synchronizes the routing tables across routing table 114, routing table 150, routing table 152, and routing table 154. Since traffic is directed from a table lookup (e.g., routing table 114) at ingress device 112, if a pod fails or is otherwise taken offline, traffic will continue to be directed to the failed pod until routing table 114 on ingress device 112 is updated/synchronized. Accordingly, the ingress device 112 can take a longer period of time than desired to discover that a pod has failed, because not only does the failure need to be detected or determined, but the ingress device 112 needs to look through a distributed database that's synchronized or updated periodically. For example, if pod 142 executing instance C 148 fails, node 140 must determine or detect the pod failure and then notify ingress device 112 before the routing table 114 can be modified to re-route traffic to another chosen pod or node.

Figure 2:
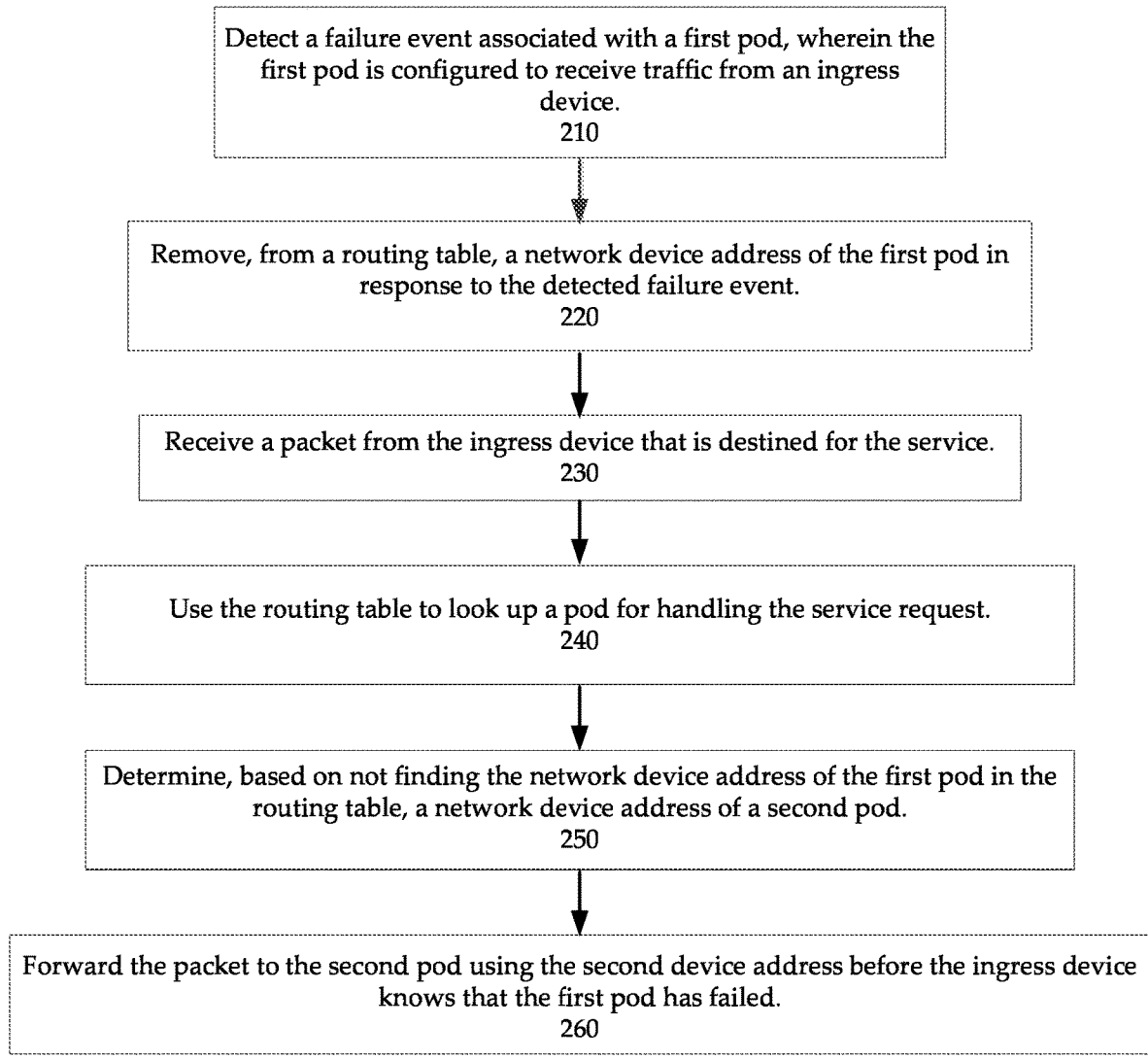
FIG. 2 is a flowchart representation of re-routing network traffic directed to one or more pod devices in accordance with some embodiments.

What is needed is a way to accelerate the recovery of system 100 if a pod fails. FIG. 2 is a flowchart representation of such a re-routing system that bypasses the ingress device 112 to re-route network traffic between what was supposed to be the egress node (the egress server) to another node that has an instance of the application or service running on it, in accordance with some embodiments.

If all the devices within the network are working properly, for example, network traffic should be in accordance with the example schematic diagram shown in FIG. 3A. FIG. 3A shows an example system 300, which can be similar to system 100 in FIG. 1, after a synchronization/update. Ingress device 312 of network 310 is in communication with node 320, node 330, and node 340. Each node can be in communication with one or more local pods (e.g., node 320 is in communication with pod 342 and pod 344; node 330 is in communication with pod 332, pod 334, and pod 336; and node 340 is in communication with pod 322 and pod 324). Pod 336 is executing instance A 338 and pod 324 is executing instance B 326 of an application or service. Similar to the vSwitch's in FIG. 1, vSwitch 360, vSwitch 358, and vSwitch 356 of node 320, node 330, and node 340, respectively, can include functionality to direct or re-direct traffic between the other nodes on system 300.

After synchronization, all the routing tables are updated between the devices on system 300. Because of this, all the nodes know the list of nodes and/or pods serving the particular application or service. As an example, all the nodes within the cluster (e.g., nodes 320, 330, 340) know that instances of a particular web service is running on pod 336 and pod 324 for instance A 338 and instance B 326, respectively. The application or service can be associated with a service identifier (e.g., "SVC:svc 1/128") that can in some embodiments work with Internet Protocol version 6 (IPv6), where multiple addresses can be assigned to the same interface. The multiple addresses can span across many different pods—either within the same node or across different nodes. IPv6 can provide larger addressing space and permit hierarchical address allocation methods that facilitate route aggregation across the Internet, among other benefits. Routing table 354 on node 320, routing table 352 on node 330, and routing table 350 on node 340, for example, have been synchronized to reflect that traffic with a service identifier of "SVC:svc 1/128" has two next hop addresses for pods executing an instance of the application or service, each address being associated with a metric that defines a priority based on pod nearness of the next hop address to each node. For any given node, for example, a local pod (e.g., a pod in communication with the given node) can be given a higher metric than a remote pod (e.g., a pod in communication with another node). Additionally and/or alternatively, the priority defining the metric of the next hop address can be based on other considerations, such as compute resources, pod capabilities, etc. that enable system 300 to load balance across the pods executing the application instances. The metric can in some examples be a combination of nearness and other considerations. Traffic can be directed towards the address with the highest metric.

For example, if there is an instance on a pod that is local to the node, the node can assign a metric with a higher priority than the priority associated with an instance on a remote pod. If there is an instance on a pod local to the node, traffic will be sent to that local node. If there is no local instance, the node will have to find a remote instance on another node it can reach.

In this example, the metric defines the nearness of the next hop address. For node 330, the next hop addresses lists local pod 336 as a higher metric (e.g., metric=1) than remote pod 324 on node 340 (metric=2). For node 340, local pod 324 has a higher metric (metric=1) than remote pod 336 (metric=2). Since none of the pods associated with node 320 are executing an instance of the application, node 320 lists both remote pods 330 and 340 with the same metric (metric=2). This information can in some embodiments be copied in a routing table of ingress device 312 (not shown). Thus, any traffic for a service or application will be routed to instance A 338 executing on pod 336, node 330.

For example, if the first priority is to send traffic to pod 336 on node 330, and directing traffic for the application or service toward pod 336 is successful, then routing table 352 will keep an entry for instance A 338. For any subsequent traffic, all packets will be directed by node 330 to pod 336 since node 330 sees the address for pod 336 in routing table 352 as the best path (e.g., has a metric equal to or higher than the other pod addresses listed within routing table 352). However, at some point pod 336 may fail.

Figure 3B:
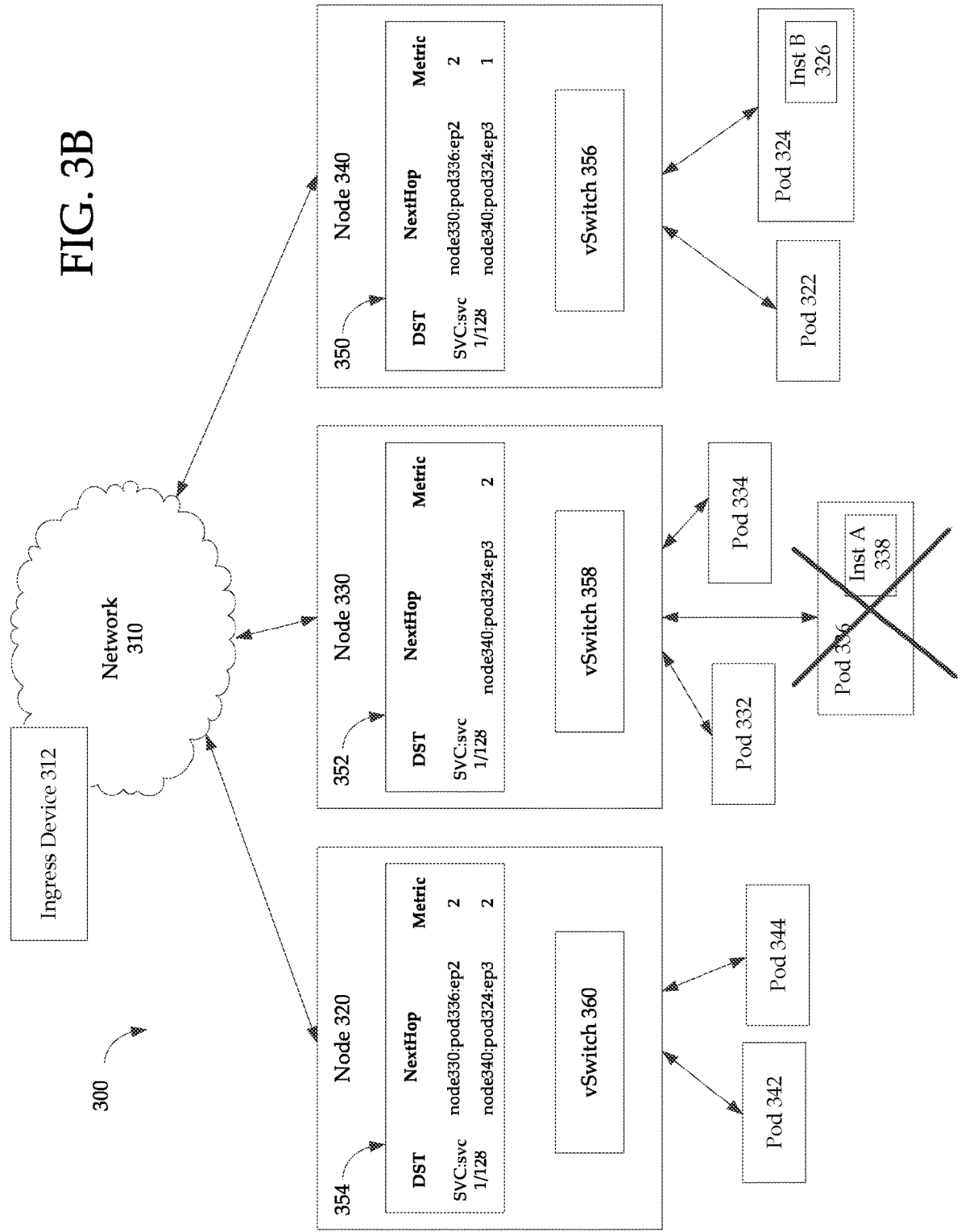
FIG. 3B shows an example schematic diagram of a pod failure event in accordance with some embodiments.

FIG. 3B shows an example schematic diagram of such a pod failure event in accordance with some embodiments. In this instance, pod 336 on node 330 has failed or has otherwise been taken offline. In example embodiments, then, node 330 detects the failure event associated with pod 336 (step 210). Since ingress device 312 does not know of pod 336's failure, ingress device 312 will continue to route traffic towards node 330 according to its unaffected load balancing priorities.

In order to re-route traffic to another executing instance of the application or service on a pod that hasn't failed before waiting for pod 336's failure to propagate back to ingress device 312, node 330 will remove from its routing table 352 the network address of the pod that has failed (e.g., the address for pod 336) in response to the detected failure event (step 220). In other words, the pod 336 address will get stripped off the routing table 352, leaving the node 340 address. This is done so that when node 330 receives the packet from ingress device 112 that is destined for the service (step 230), the routing table lookup for node 330 (step 240) will find the network address of node 340 instead of the network address of pod 336.

Based on node 330 being unable to find the network address of pod 336, node 330 can determine a network device address of another pod (step 250) to re-route traffic towards. As an example, once the network device address of pod 336 is removed from routing table 352, the network device address of pod 324 that's executing instance B 326 of the application or service can be selected based on it being a remaining address within the list of addresses in routing table 352 with the highest metric. While FIG. 3B shows one remaining address within routing table 352, it is noted that any number of addresses may be associated with the service identifier ("SVC:svc 1/128"), and the next node or local pod selected can be based on their associated metrics—thus, in the event that the network device address of pod 336 is removed, traffic can be redirected to any remaining local pod or node with the highest metric.

The selection of another node and/or pod can be based on one or more factors relating to load balancing of the traffic, location of the node or pod (e.g., whether the node or pod is local or remote to the original pod), or compute resources of devices associated with the pods or nodes included in the list of next hop addresses. In some embodiments, re-routing the packets can bypass the ingress device 312 further based on a priority metric that is associated or assigned to each executing instance based on a composite or combination of factors, each priority metric associated or assigned based on any number of factors discussed above (e.g., load balancing of the traffic, location of the node or pod, or compute resources of devices, etc.).

Accordingly, node 330 that receives traffic destined for the service ("SVC:svc 1/128") can be configured to bypass ingress device 312 and re-rout traffic by looking up the service identifier in its routing table when node 330 cannot find the network address for a local pod (e.g., pod 336, since it's been removed from routing table 352). The service identifier is associated with network addresses of devices executing instances of the application or service, including local and remote instances. In some embodiments the lookup of the service identifier will only be done by the node if there's been a failure of a pod.

In some example embodiments the service identifier can be included within a packet header of a packet sent as part of the traffic. Thus, in response to receiving traffic directed to a pod that node 330 does not recognize (e.g., by not finding it within routing table 352), node 330 may look up another executing instance on network device addresses of other pods based on the destination identifier in the packet header listing the other network devices executing similar executing instances of the service. For example, the service identifier "SVC:svc 1/128" may list pod 324 on node 340 as executing instance B 326 of the application or service.

As a result, node 330 can forward the packet and/or any subsequent traffic initially directed to pod 336 by opening a new connection to pod 324 using pod 324's device address listed within routing table 352 before ingress device 312 knows that pod 336 has failed (step 260). FIG. 3C shows an example schematic diagram of re-routing network traffic in accordance with some embodiments. For example, the packets are re-routed by the node itself (node 330) before all the routing tables for all the nodes in communication with ingress device 312 have to be updated or synchronized. As long as node 330 can find or determine that pod 324 or node 340 is reachable, the instance of the application can be migrated from node 330 to pod 324 on node 340 by re-routing and directing packets of the traffic towards pod 324 Node 330 can then route the packets from vSwitch 358 to vSwitch 356 on node 340 (by opening new connection 380).

In some instances, an infinite loop may unintentionally arise if the other pod fails as well. For example, if traffic is redirected to pod 324 because pod 336 has failed, but then pod 324 dies as well before the next update or synchronization, then pod 324 may try to redirect traffic to pod 336. For example, pod 324's failure would remove it from routing table 350, meaning that table 350 would list pod 336 while routing table 352 would list pod 324. To correct for this scenario, in some embodiments the service identifier listing the destination ("SVC:svc 1/128") can be replaced with the pod IP for a second choice pod.

Figure 4:
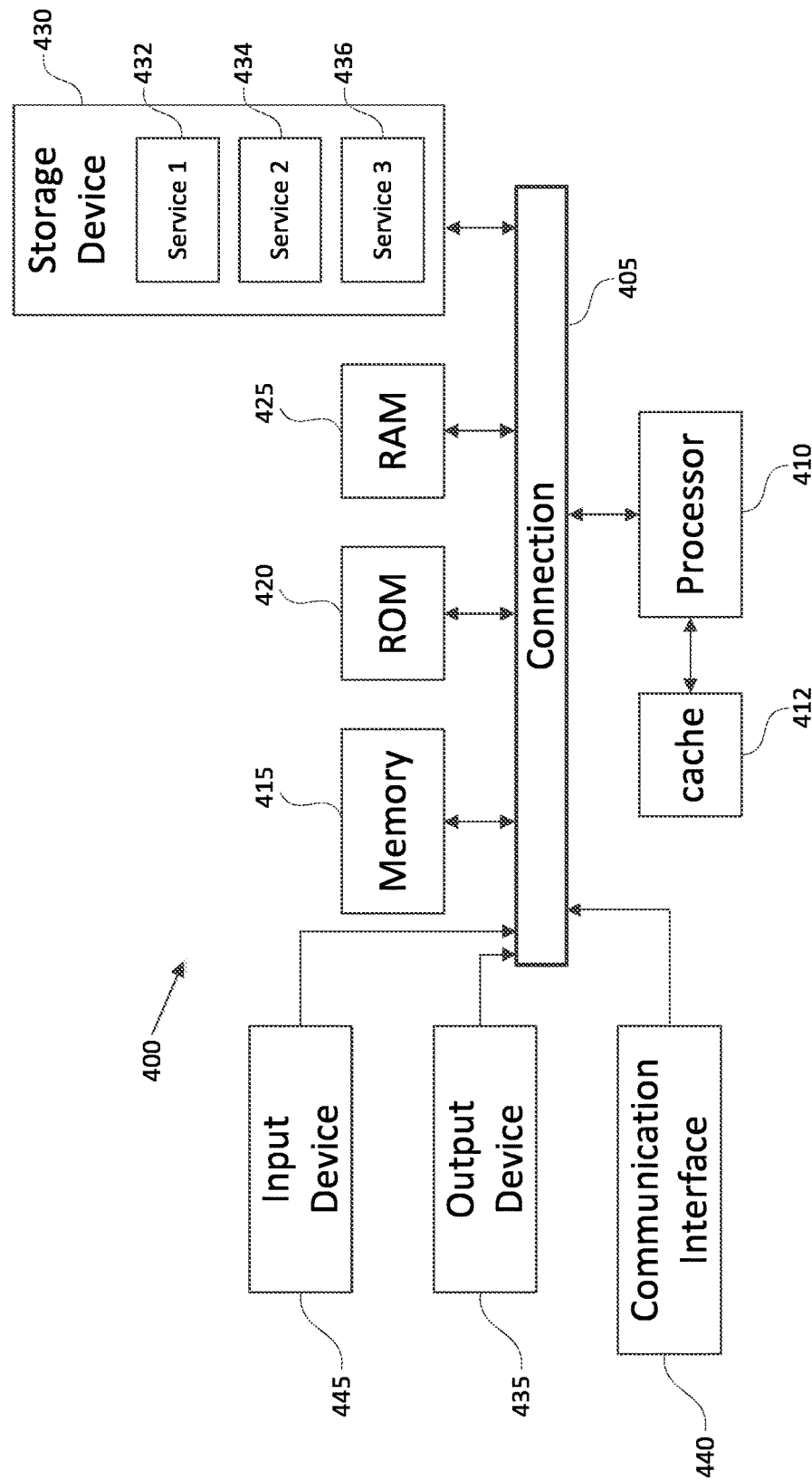
FIG. 4 shows an example of a system for implementing certain aspects of the present technology.

FIG. 4 shows an example of computing system 400 in which the components of the system in FIGS. 1, 3A, 3B, and 3C are in communication with each other using connection 405. Connection 405 can be a physical connection via a bus, or a direct connection into processor 410, such as in a chipset architecture. Connection 405 can also be a virtual connection, networked connection, or logical connection.

In some embodiments computing system 400 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 400 includes at least one processing unit (CPU or processor) 410 and connection 405 that couples various system components including system memory 415, such as read only memory (ROM) and random access memory (RAM) to processor 410. Computing system 400 can include a cache of high-speed memory connected directly with, in close proximity to, or integrated as part of processor 410.

Processor 410 can include any general purpose processor and a hardware service or software service, such as services 432, 434, and 436 stored in storage device 430, configured to control processor 410 as well as a special-purpose processor where software instructions are incorporated into the actual processor design. Processor 410 may essentially be a completely self-contained computing system, containing multiple cores or processors, a bus, memory controller, cache, etc. A multi-core processor may be symmetric or asymmetric.

To enable user interaction, computing system 400 includes an input device 445, which can represent any number of input mechanisms, such as a microphone for speech, a touch-sensitive screen for gesture or graphical input, keyboard, mouse, motion input, speech, etc. Computing system 400 can also include output device 435, which can be one or more of a number of output mechanisms known to those of skill in the art. In some instances, multimodal systems can enable a user to provide multiple types of input/output to communicate with computing system 400. Computing system 400 can include communications interface 440, which can generally govern and manage the user input and system output. There is no restriction on operating on any particular hardware arrangement and therefore the basic features here may easily be substituted for improved hardware or firmware arrangements as they are developed.

Storage device 430 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 430 can include software services, servers, services, etc., that when the code that defines such software is executed by the processor 410, it causes the system to perform a function. In some embodiments, a hardware service that performs a particular function can include the software component stored in a computer-readable medium in connection with the necessary hardware components, such as processor 410, connection 405, output device 435, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A device for re-routing network traffic direct to one or more pod devices comprising:
   one or more processors; and
   at least one non-transitory memory coupled to the one or more processors comprising instructions stored thereon, the instructions executable by the one or more processors of a computing system to:
      detect a failure event associated with a first pod, wherein the first pod is configured to receive traffic from an ingress device;
      remove, from a routing table, a network device address of the first pod in response to the detected failure event;
      receive a packet from the ingress device that is destined for a service;
      use the routing table to look up a pod for handling a service request associated with the service;

determine, based on not finding the network device address of the first pod in the routing table, a network device address of a second pod; and forward the packet to the second pod using the second device address before the ingress device knows that the first pod has failed.

2. The device of claim 1, wherein the first pod and the second pod are configured to execute similar executing instances of an application.

3. The device of claim 1, wherein the instructions executable by the one or more processors are configured to bypass the ingress device when re-routing packets by:

in response to receiving the packet and the removal of the network device address, look up a destination identifier in a packet header of the packet.

4. The device of claim 3, wherein the network device address of the second pod is determined based on the destination identifier in the packet header, the destination identifier listing other network devices executing similar executing instances of a service.

5. The device of claim 3, wherein the destination identifier is removed from the packet after being forwarded to the second pod.

6. The device of claim 1, further comprising a virtual switch configured to:

in response to determining that the second pod is reachable, migrate the instance of the application to the second pod by re-encapsulating packets to be directed to the second pod.

7. The device of claim 1, wherein the application is associated with multiple instances executing on a plurality of pods, wherein bypassing the ingress device when re-routing packets is based in part on a priority metric associated with each executing instance.

8. The device of claim 1, wherein the packets are re-routed before all routing tables for all nodes in communication with the ingress device are updated.

9. The device of claim 1, wherein once the network device address of the first pod is removed from the routing table, the network device address of the second pod is selected based on a list of addresses in the routing table, the selection based on one or more of load balancing, location, or compute resources of devices associated with the list of addresses.

10. A method for re-routing packets at an egress device comprising:

bypassing an ingress device when re-routing packets by:
  detecting a failure event associated with a first pod, wherein the first pod is configured to receive traffic from an ingress device;
  removing, from a routing table, a network device address of the first pod in response to the detected failure event;
  receiving a packet from the ingress device that is destined for a service;
  using the routing table to look up a pod for handling a service request associated with the service;
  determining, based on not finding the network device address of the first pod in the routing table, a network device address of a second pod; and
  forwarding the packet to the second pod using the second device address before the ingress device knows that the first pod has failed.

11. The method of claim 10, wherein the first pod and the second pod are configured to execute similar executing instances of an application.

12. The method of claim 10, the method further comprising:

in response to receiving the packet and the removal of the network device address, look up a destination identifier in a packet header of the packet.

13. The method of claim 12, wherein the network device address of the second pod is determined based on the destination identifier in the packet header, the destination identifier listing other network devices executing similar executing instances of a service.

14. The method of claim 12, wherein the destination identifier is removed from the packet after being forwarded to the second pod.

15. The method of claim 10, the method further comprising:

in response to determining that the second pod is reachable, migrate, by a virtual switch, the instance of the application to the second pod by re-encapsulating packets to be directed to the second pod.

16. The method of claim 10, wherein the application is associated with multiple instances executing on a plurality of pods, wherein bypassing the ingress device when re-routing packets is based in part on a priority metric associated with each executing instance.

17. The method of claim 10, wherein the packets are re-routed before all routing tables for all nodes in communication with the ingress device are updated.

18. The method of claim 10, wherein once the network device address of the first pod is removed from the routing table, the network device address of the second pod is selected based on a list of addresses in the routing table, the selection based on one or more of load balancing, location, or compute resources of devices associated with the list of addresses.

19. A non-transitory computer-readable medium comprising instructions stored thereon, the instructions executable by one or more processors of a computing system to:

bypass an ingress device when re-routing packets by:
  detecting a failure event associated with a first pod, wherein the first pod is configured to receive traffic from an ingress device;
  removing, from a routing table, a network device address of the first pod in response to the detected failure event;
  receiving a packet from the ingress device that is destined for a service;
  using the routing table to look up a pod for handling a service request associated with the service;
  determining, based on not finding the network device address of the first pod in the routing table, a network device address of a second pod; and
  forwarding the packet to the second pod using the second device address before the ingress device knows that the first pod has failed.

20. The non-transitory computer-readable medium of claim 19, wherein, in response to determining that the second pod is reachable, migrating, by a virtual switch, the instance of the application to the second pod by re-encapsulating packets to be directed to the second pod.

* * * * *